United States Patent [19]

Wang

[11] Patent Number: 5,669,536
[45] Date of Patent: Sep. 23, 1997

[54] DEVICE FOR LOCATING SHACKLE LOCK ON BICYCLE FRAME

[76] Inventor: Lopin Wang, 5F, No. 1, Lane 85 Kwang Fu North Rd., Taipei City, Taiwan

[21] Appl. No.: 680,544

[22] Filed: Jul. 9, 1996

[51] Int. Cl.⁶ ........................................................ B62J 11/00
[52] U.S. Cl. ...................... 224/443; 224/448; 224/459; 224/935; 248/230.1; 248/292.12
[58] Field of Search .................. 224/935, 441, 224/448, 419, 420, 424, 425, 451, 459, 461; 70/233; 248/230.1, 292.12, 220.22, 222.11

[56] References Cited

U.S. PATENT DOCUMENTS

| | | | |
|---|---|---|---|
| 1,735,212 | 11/1929 | Pawsat | 224/420 |
| 3,734,439 | 5/1973 | Wintz | 224/448 |
| 4,570,835 | 2/1986 | Criqui et al. | 224/446 |
| 5,127,562 | 7/1992 | Zane et al. | 224/935 |
| 5,386,961 | 2/1995 | Lu | 224/425 |
| 5,395,016 | 3/1995 | Minoura | 224/935 |
| 5,405,113 | 4/1995 | Jaw | 224/935 |

*Primary Examiner*—Henry J. Recla
*Assistant Examiner*—Gregory M. Vidovich
*Attorney, Agent, or Firm*—Browdy and Neimark

[57] ABSTRACT

A device for locating a shackle lock on a bicycle frame is composed of a first member, a second member, a locking member, and a third member. The first member has an axial hole engageable with a bicycle frame tube such that the first member can be turned in the range of 360 degrees. The second member is joined with the first member by the locking member such that the second member can be adjusted in the range of 360 degrees on the locking member serving as an axis, and that the first and the second members are fastened securely with the bicycle frame tube when the locking member is tightened up. The third member is fastened with one end of the shackle of the shackle lock for locating the shackle lock on the second member.

3 Claims, 4 Drawing Sheets

DEVICE FOR LOCATING SHACKLE LOCK ON BICYCLE FRAME

FIELD OF THE INVENTION

The present invention relates generally to a lock locating device, and more particularly to a device for locating a shackle lock on a bicycle frame.

BACKGROUND OF THE INVENTION

The Taiwanese Patent No. 75212374 discloses a device for locating a shackle lock on a bicycle frame. The device has a base which is fastened at one end thereof with the bicycle frame and has another end for holding a shackle lock. The shackle lock is located such that it extends beyond the bicycle frame tube vertically. Such a device as described above is not suitable for use in a lady's bike.

Another Taiwanese Patent 79208634 discloses a device for locating a shackle lock on a bicycle frame. The device has a base with two C-shaped structures fastened therewith for holding the shackle locks. The device is intended for use in both a man's bike and a lady's bike.

SUMMARY OF THE INVENTION

The primary objective of the present invention is to provide a device capable of locating freely a shackle lock on bicycle frames of various types.

The device of the present invention comprises a first member, a second member, a locking member, and a third member. The first member has an axial hole engageable with the bicycle frame such that a 360-degree adjustment of the first member can be made. The second member is joined with the first member by the locking member such that the second member can be adjusted in the range of 360 degrees on the locking member serving as an axis, and that the first and the second members are fastened securely with the bicycle frame when the locking member is tightened up. The third member is fastened with one end of the shackle of the shackle lock for locating the shackle lock on the second member.

DETAILED DESCRIPTION OF THE INVENTION

Figure 1:
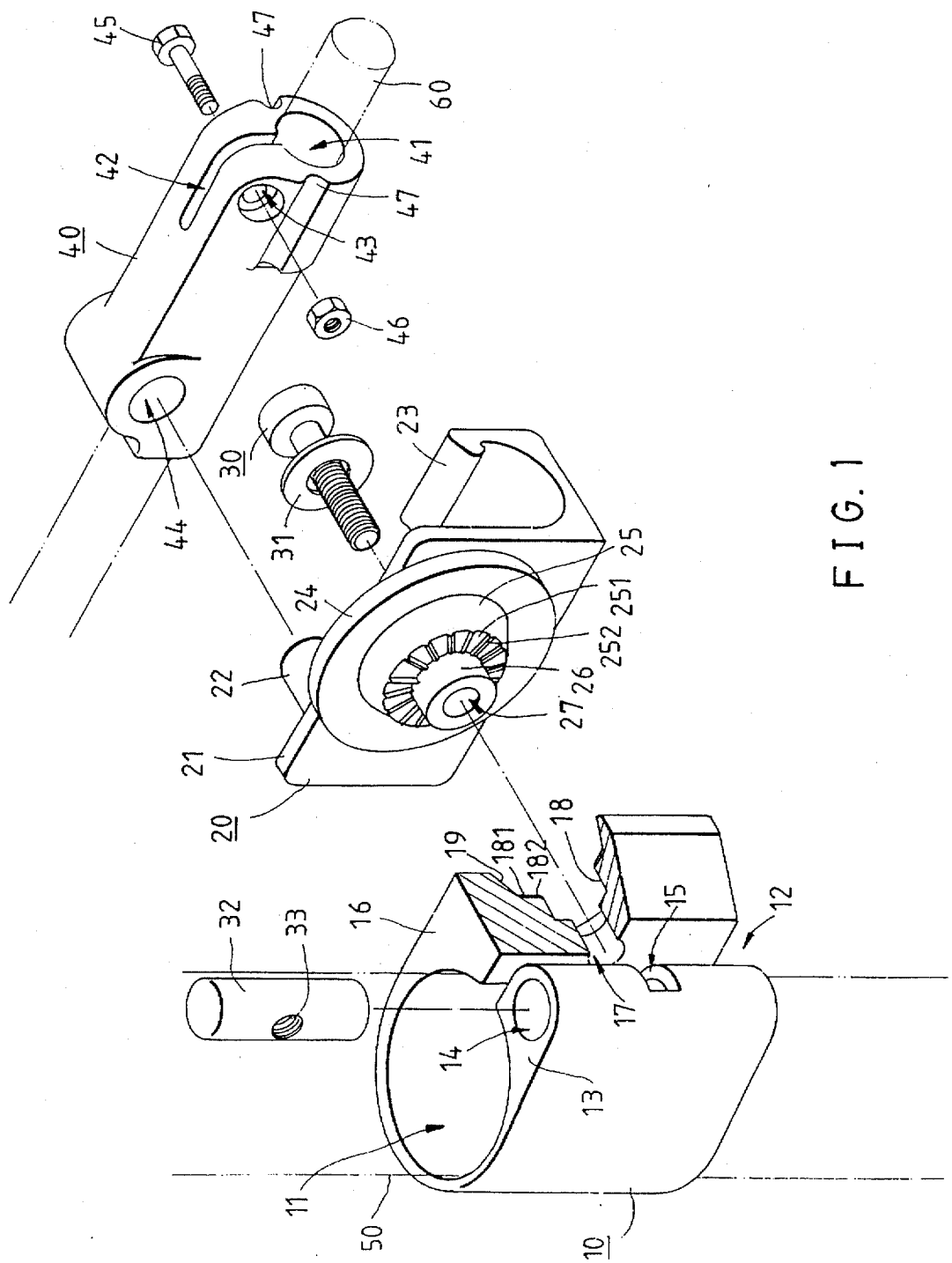
FIG. 1 shows an exploded view of a preferred embodiment of the present invention.
Figure 2:
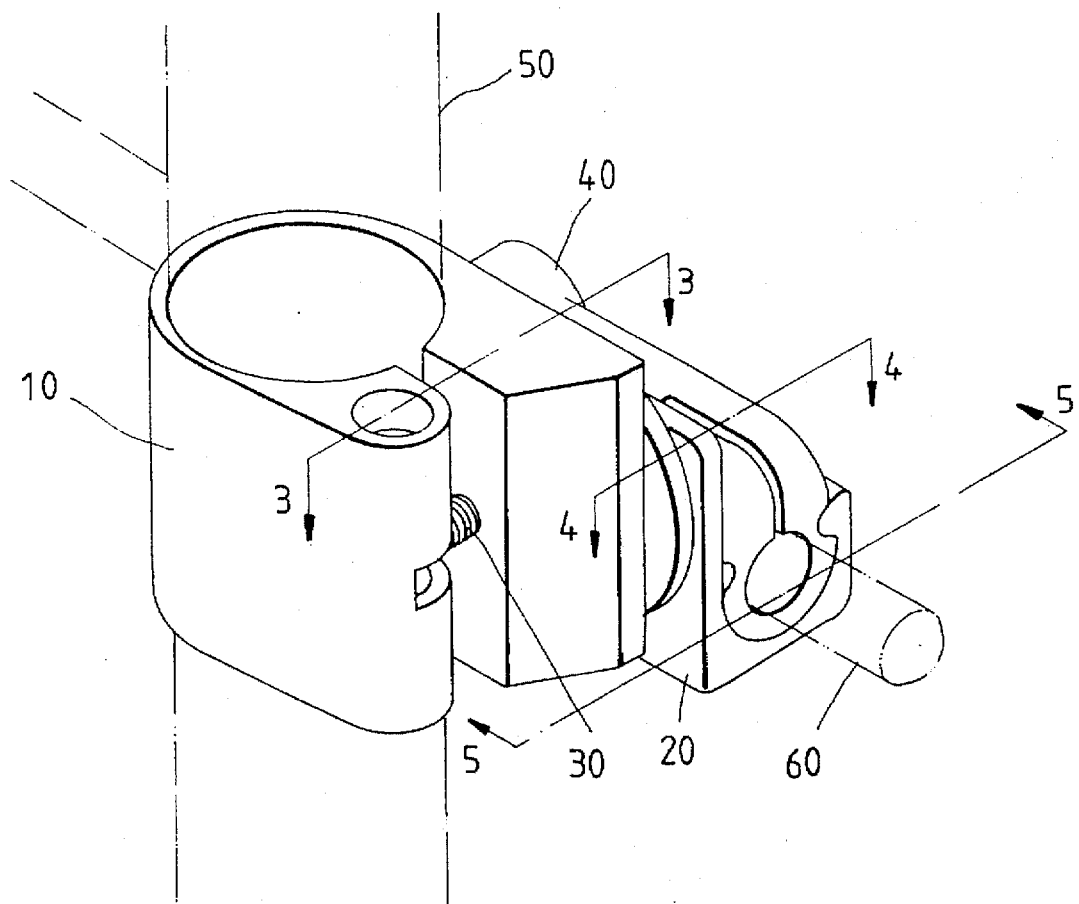
FIG. 2 shows a perspective view of the present invention in combination.
Figure 3:
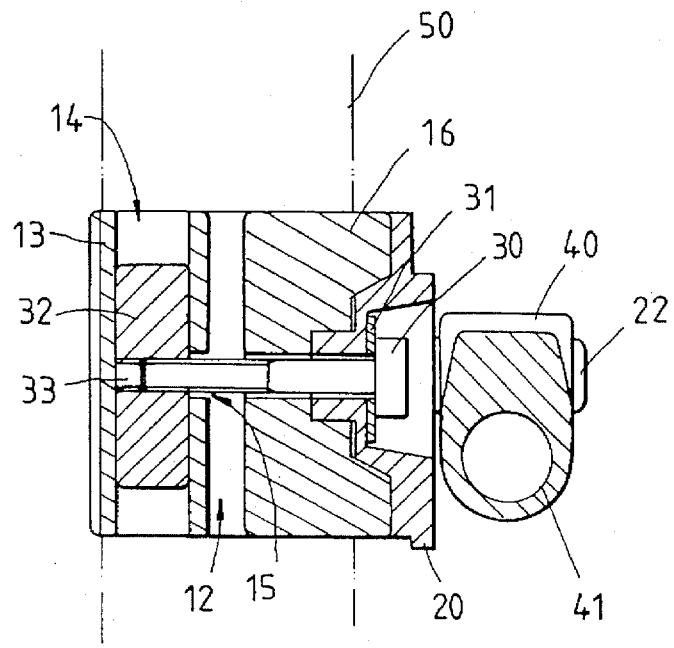
FIG. 3 shows a sectional view of a portion taken along the direction indicated by a line 3—3 as shown in FIG. 2.
Figure 4:
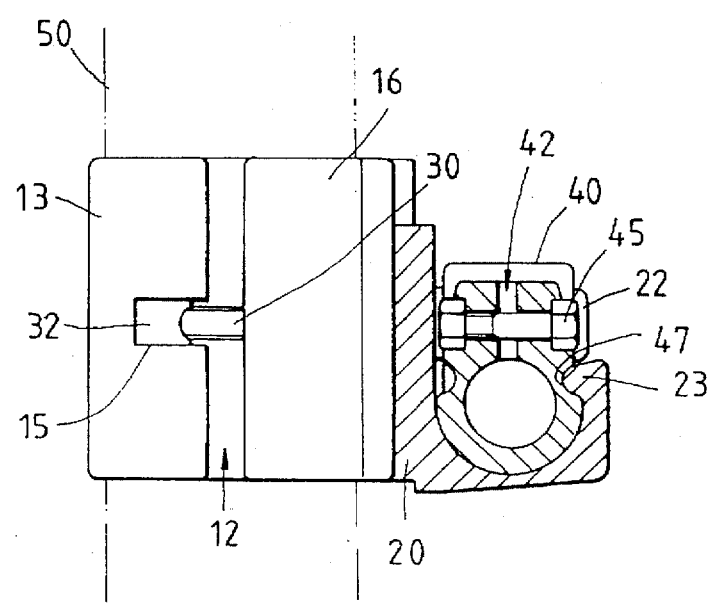
FIG. 4 shows a sectional view of a portion taken along the direction indicated by a line 4—4 as shown in FIG. 2.

As shown in FIGS. 1–4, the device embodied in the present invention for locating a shackle lock on a bicycle frame is composed of the component parts which are described explicitly hereinafter.

A first member 10 has an axial guide hole 11, a guide axial hole 11, and a slot 12. The first member 10 has a C-shaped cross section. The axial hole 11 is so dimensioned to fit over a bicycle frame 50, which is indicated by the dotted lines in FIG. 2. The first member 10 can be adjusted in the range of 360 degrees. The slot 12 has a side wall 13 provided with a through hole 14 parallel to the axial hole 11. The side wall 13 is further provided radially with an arcuate slot 15 in communication with the through hole 14 and the slot 12. Located in another side wall 16 of the slot 12 is a through hole 17 corresponding in location to the arcuate slot 15. The through hole 17 has a center line perpendicular to the axis of the axial hole 11. Located in the outer side of the through hole 17 are two stepped round slots 18 and 19. Located between the round slots 18 and 19 is a shoulder 181 which is provided radially with a plurality of slots 182 arranged in a radiate fashion.

A second member 20 has a body 21, which is provided on two sides of one face thereof with a protruded portion 22 and a hooked portion 23. The body 21 has another face, which is provided with three stepped round projections 24, 25 and 26. The body 21 is provided axially with a through hole 27. Located between the projections 25 and 26 is a shoulder 251 which is provided radially with a plurality of ribs 252 arranged in a radiate pattern. The second member 20 is joined with the first member 10 such that the round projections 26 and 25 are engaged with the round slots 18 and 19 of the first member 10, and that the ribs 252 of the second member 20 are located in the slots 182 of the first member 10.

A locking member 30, which is a bolt, is put through the through hole 27 of the second member 20 and the through hole 17 and the slot 15 of the first member 10 for fastening securely the second member 20 with the first member 10 such that the second member 20 can be turned in the range of 360 degrees on the locking member 30 which serves as an axis.

A pad 31 is fastened with the locking member 30 such that the pad 31 is located on the outer side of the second member 20.

A locating member 32 of a columnar construction is provided with a threaded hole 33 extending in the direction of the short axis of the locking member 32. The locating member 32 is received in the through hole 14 such that the threaded hole 33 is corresponding in location to the slot 15 for fastening the locking member 30 with the locating member 32. In other words, the first member 10 and the second member 20 are fastened securely with the bicycle frame 50, thanks to the locating member 32.

A third member 40 is provided with a through hole 41 extending in the direction of the longitudinal axis of the third member 40. The third member 40 is further provided in one end wall thereof with a slot 42 extending along the radial direction of the through hole 41 to pass through the through hole 41. The slot 42 is provided respectively in two side walls thereof with a through hole 43 perpendicular to the planar direction of the slot 42. The third member 40 is still further provided in another end wall thereof with a connection hole 44 perpendicular to the longitudinal axis of the third member 40. One end of the shackle 60 (indicated by the dotted lines in FIG. 2) is received in the through hole 41 of the third member 40 and is located by a bolt 45 passing through the through hole 43 and engageable with a nut 46. The side walls located under the slot 42 are provided respectively with a recessed portion 47 engageable with the hooked portion 23.

In the process of locating the shackle lock on a bicycle frame, the first member 10 is first fitted at a predetermined position of the bicycle frame before setting up a desired angle formed by the first member 10 and the second member 20. The first member 10 and the second member 20 can be fastened simultaneously with the bicycle frame by means of the locking member 30 and the locating member 32. As the locking member 30 is unfastened, the second member 20 can be adjusted in the range of 360 degrees on the locking member 30 which serves as a rotating axis, in addition to the first member 10 which can be adjusted in the range of 360 degrees around a bicycle frame tube. Such angular adjustments of the first member 10 and the second member 20 as described above are made possible by the locking member 30, which has an axis perpendicular to the axis of the bicycle frame tube to which the shackle lock is fastened.

The third member 40 is fastened with the shackle 60. For this reason, the process of locating the shackle lock on the bicycle frame can be carried out by fitting the connection hole 44 of the third member 40 over the protruded portion 22 of the second member 20 before pressing the third member 40 toward the hooked portion 23 of the second member 20 so as to enable the hooked portion 23 to engage securely the recessed portion 47 of the third member 40. The shackle lock can be disengaged with the bicycle frame by following the above-described steps in reverse.

Figure 5:
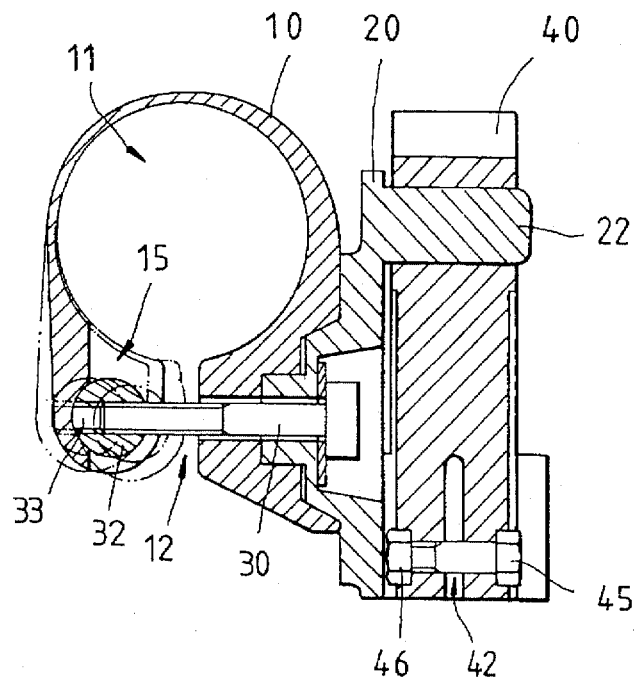
FIG. 5 shows a sectional view of a portion taken along the direction indicated by a line 5—5 as shown in FIG. 2.

As shown in FIG. 5, the interval of the slot 12 of the first member 10 is greater. In conjunction with the slot 15, the columnar locating member 32 and the locking member 30, the device of the present invention is adapted to the bicycle frame tubes of various specifications.

Figure 6:
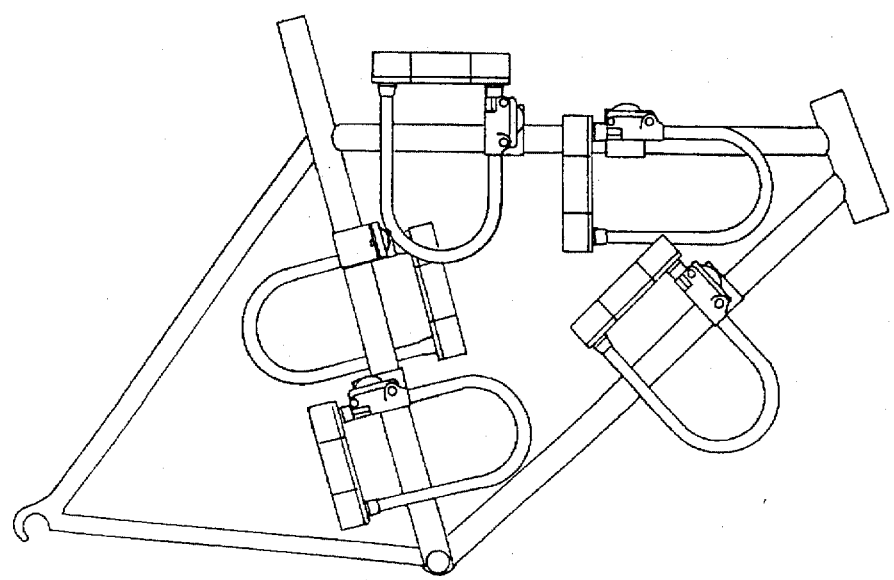
FIG. 6 shows a schematic view of the present invention in use.

As shown in FIG. 6, the device of the present invention can be mounted on any allowable position of a bicycle frame such that the angle between the first member 10 and the second member 20 can be adjusted freely. In addition, the second member 20 may be provided with a rib corresponding in location to another recessed portion 47 of the third member 40 for enhancing the retaining effect of the second member 20 and the third member 40.

What is claimed is:

1. A device for locating a shackle lock on a bicycle frame, said device comprising:
   a first member having an axial hole and opposing side walls defining a slot penetrating a side of said axial hole, said first member having a C-shaped cross section such that said axial hole can be fitted over a bicycle frame tube and that said first member can be adjusted in the angular range of 360 degrees;
   a second member having a protruded portion and a hooked portion;
   a locking member of a long rod-shaped construction and disposed in such a manner that said locking member fastens said second member with said first member by penetrating said second member and each of said opposing side walls of said slot of said first member along a direction perpendicular to a center axis of said axial hole of said first member, said second member capable of being rotated on said locking member in a range of 360 degrees, said second member capable of being tightened to said first member by said locking member to locate securely said first member and said second member on said bicycle frame tube; and
   a third member adapted to be fastened with one end of a shackle of a shackle lock and provided with a connection hole and a recessed portion, said connection hole being engageable with said protruded portion of said second member, and said recessed portion being engageable with said hooked portion of said second member.

2. The device as defined in claim 1, wherein said slot of said first member is provided in one side wall thereof with a through hole, said side wall having at the center of an inner side thereof an arcuate slot extending along the radial direction of said through hole, said through hole dimensioned to receive therein a locating member of a columnar construction, said locating member provided with a threaded hole corresponding in location to said arcuate slot for fastening said locking member.

3. The device as defined in claim 1, wherein said third member is provided with a through hole extending along the direction of a longitudinal axis of said third member and engageable with the shackle of said shackle lock, said third member further provided in one end wall thereof with a slot for locating said third member and said shackle in conjunction with a fastening bolt engageable with said slot of said third member.

* * * * *